Figure 1:
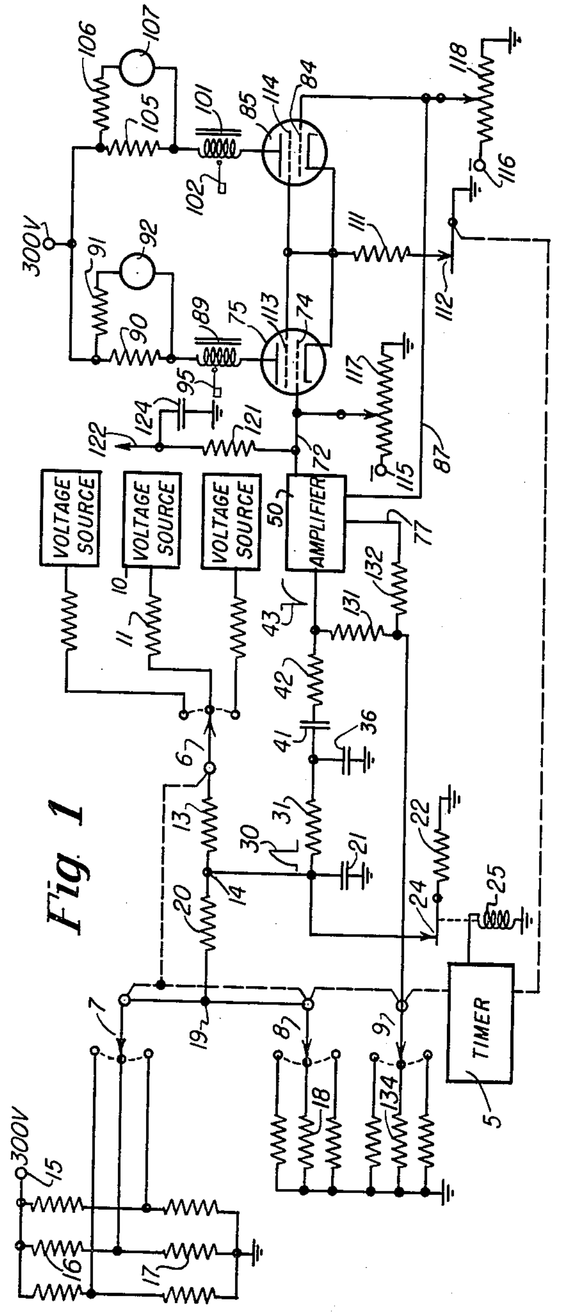

Nov. 21, 1961 W. F. FERGUSON 3,010,068

VOLTAGE MEASURING SYSTEM

Filed Nov. 27, 1957

INVENTOR.
William F Ferguson
BY Mueller & Aichele
Attys.

3,010,068
VOLTAGE MEASURING SYSTEM

William F. Ferguson, Scottsdale, Ariz., assignor to Motorola, Inc., Chicago, Ill., a corporation of Illinois Filed Nov. 27, 1957, Ser. No. 699,309
4 Claims. (Cl. 324—133)

This invention relates to voltage measuring devices, and more particularly to devices for periodically checking a control voltage to see that it is within predetermined limits.

Where control voltages of predetermined magnitudes are required for automation and other systems, periodic measurements of the voltages is desired to see that they are within the proper tolerance bands. Devices are known which compare a control voltage with a predetermined test voltage and apply the difference to vacuum tube circuits which measure the difference. However, such devices have been subject to instability due to the changeability of vacuum tube characteristics and difficulty of adjustment thereof. Further, previously known devices have been quite complex and expensive to manufacture.

It is accordingly an object of the invention to provide a new and improved device for repeatedly measuring a voltage.

Another object of the invention is to provide a simple and effective device for measuring a direct current voltage wherein amplification may be used.

A further object of the invention is to provide a system for measuring direct current voltages and indicating when the voltages fall outside predetermined limits.

A still further object of the invention is to provide a system for repeatedly comparing a direct current control voltage with a standard voltage at a high rate of speed.

A feature of the invention is the provision of a system in which a control voltage which should be within predetermined limits is matched against a standard voltage, and the voltage derived from such matching operation is applied to a capacitance network which is periodically discharged by means of a periodically operable relay to form pulses which actuate an amplifier controlling a trigger circuit which indicates whether the control voltage is within desirable limits.

A further feature of the invention is the provision of a system for automatically monitoring a plurality of voltages wherein the voltages are checked in order, and a visual indication and a record of voltages falling above and below predetermined limits is automatically made.

Another feature of the invention is the provision of a system in which a direct current control voltage which is to be maintained within predetermined limits is compared with a standard direct current voltage, with the two voltages being applied against one another through a voltage divider having a tap leading to a capacitor which is periodically charged by the difference voltage and periodically shunted to ground through contacts of a periodically operated relay. The pulses formed during the discharge period of the capacitor are applied to an integrating network and then to a differentiating network, with the differentiated pulses being applied to an amplifier having an output stage which applies one pulse inverted in form to an indicator controlling thyratron, and applies a second uninverted pulse through a resistance-capacitance network to a second indicator controlling thyratron, with the thyratrons firing if the control voltage is too large or too small.

Figure 2:
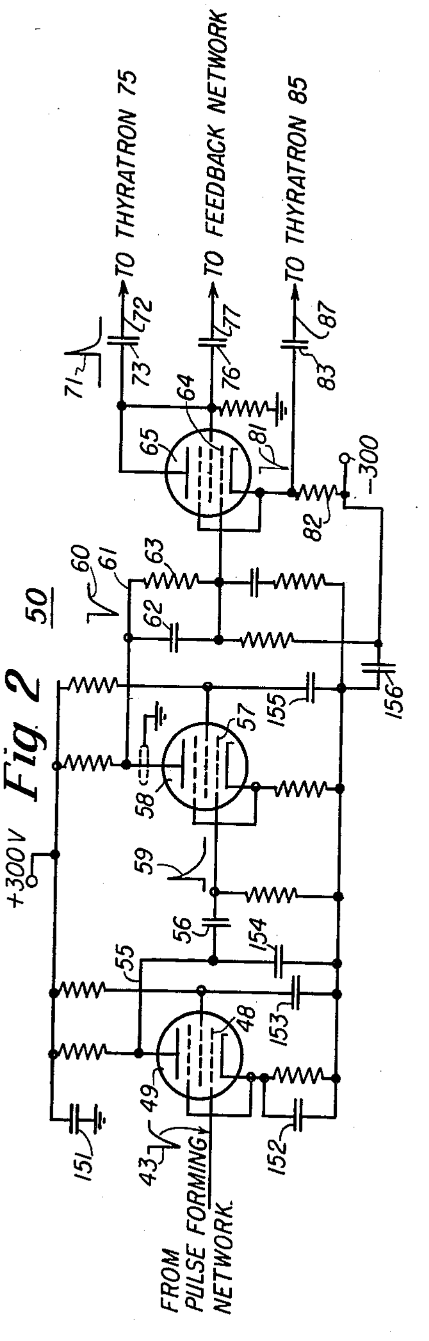

In the drawings:

FIG. 1 shows a wiring diagram of a system forming one embodiment of the invention; and FIG. 2 is the circuit of the amplifier 50 of FIG. 1.

The invention provides a device for measuring a control voltage and includes a resistance network connected at one end to a constant voltage source and at its other end to the source of the control voltage, with a center point connected to a capacitor. The capacitor charges to a value determined by the difference between the control voltage and the standard voltage. A relay has contacts in series with a resistor shunting the capacitor and operates periodically to close the contacts and discharge the capacitor to form pulses. Each pulse is integrated to smooth out any variations from relay contact chatter and then is differentiated. The differentiated pulses are applied to an amplifier which has a final stage from which the amplified pulses are fed to two thyratrons being applied in inverted form to one thyratron, and applied through a cathode follower and a resistance-capacitance network to the second thyratron. Each thyratron controls an indicator, such as a hammer solenoid. When the control voltage is above its upper allowable limit, the inverted pulse fires the first thyratron. When the control voltage is below its lower allowable limit, the pulse at the input of the system is of opposite polarity and fires the second thyratron. Accordingly, the indicators show when the control voltage is outside the allowable limits.

In FIG. 1 of the drawing, there is shown a system for continuously monitoring a plurality of voltages. A timing system 5 controls a stepping switch which may have a plurality of levels 6, 7, 8 and 9 to check a plurality of voltages in sequence. Connected to the contacts of the levels 6 are the control voltages 10 which may be used for any desired purpose and which must be maintained within predetermined limits. Although three voltage sources are illustrated it is obvious that a larger number may be checked. The control voltage is applied through a resistor 11, the contacts of level 6, and a resistor 13 to a point 14. A standard voltage of a fixed magnitude at terminal 15 is supplied to resistors 16 and 17 connected through levels 7 and 8 to resistor 18 and forming a voltage divider providing a reference voltage at point 19. This is connected through resistor 20 to the point 14. By these elements, the test or control voltage from the source 10 is applied against the voltage from the terminal 15 which is adjusted to a value to balance the control voltage. The difference voltage at point 14 is applied to capacitor 21 across which resistor 22 and contacts 24 of a relay 25 are connected in series. The relay 25 is operable periodically by pulses from the timer 5. The relay was operated in one successful example at a frequency of 2 cycles per second and the period of opening of the contacts 24 was 0.2 second.

When the relay 25 is operated, the contacts 24 are opened to disconnect resistor 22, and the capacitor 21 charges up due to the voltage on the point 14. Relay 25 now opens closing contacts 24, discharging capacitor 21 and forming pulse 30 whose height is determined by the voltage at the point 14. The pulse 30 is integrated by the resistor 31 and a capacitor 36, which integration serves to smooth out any uneveness caused by chatter of the contacts 24 from the trailing end of the pulse 30. The integrated pulse is differentiated by capacitor 41 and resistors 42, 131 and 134 to form a pulse 43 whose magnitude is proportional to the height of the pulse 30. The pulse 43 is applied to an amplifier 50 which is shown in FIG. 2. As shown in FIG. 2, the pulse 43 is applied to the control grid 48 of the vacuum tube 49 and reduces the conductivity of the tube 49 to an extent determined by the height of the pulse. This raises the voltage on output line 55 coupled by capacitor 56 to the control grid 57 of a vacuum tube 58, and forms a pulse 59 which is inverted relative to the pulse 43. An output line 61 of the stage including the tube 58 is coupled by capacitor 62 and resistor 63 to control grid 64 of vacuum tube 65 forming the final output stage of the amplifier 50, and the pulse 59 is inverted and amplified to form a pulse 60 which is applied to the control grid 64. The pulse 60 reduces the conductivity of the tube 65 to an extent proportional to the height of the pulse 60. Three outputs are derived from the stage 65, an inverted pulse 71 from the plate of the tube is applied through condenser 73 to output line 72 a pulse of the same polarity is applied through capacitors 76 to line 77 to the feedback circuit, and a pulse 81 of opposite polarity is derived across resistor 82 connected to the cathode of tube 65 and applied through capacitor 83 to the line 87.

Returning now to FIG. 1, the inverted pulse 71 is applied through line 72 to the grid 74 of thyratron 75. The pulse 81 obtained from the cathode of the final stage of the amplifier 65 is applied through capacitor 83 to the control grid 84 of thyratron 85. This pulse is not inverted in the stage 65 and is of opposite polarity to the pulse 71. It is believed to be evident that the magnitude or height of the pulse 71 is in proportion to the magnitude of the control voltage from the source. That is, the higher the control voltage 10, the greater the height of the pulse 71 applied to the thyratron 75. If the pulse 71 has a sufficient height it will trigger the thyratron 75 to actuate a hammer solenoid 89 in the plate circuit thereof. It will also energize the indicating lamp 92 connected in series with resistor 91 across resistor 90. When actuated, the solenoid 89 operates an arm 95 which makes a mark on a strip of paper to indicate to an operator of the apparatus that the control voltage is above its allowable limit.

The foregoing description illustrates the condition when the voltage being measured is greater than the reference voltage and is above its limits. When the voltage is below the reference voltage, the pulse 30 developed across capacitor 21 will be of opposite polarity or negative. This will invert the pulse 43 applied to the amplifier 50 and also the pulses 71 and 81 at the output of the amplifier. In the condition previously described the pulse 81 is negative and therefore will not cause the thyratron 80 to conduct. However, in the inverted condition, the pulse 81 will be positive and will render the thyratron 85 conducting when the pulse reaches a predetermined amplitude. The thyratron 85 will then actuate hammer solenoid 101 to operate the arm 102 thereof which makes a mark on the paper strip. When the thyratron 85 is conducting the indicator lamp 107 connected in series with resistor 106 across resistor 105 will also indicate that the voltage is below its allowable limit.

The cathodes of the thyratron 75 and 85 are connected by resistor 111 and switch 112 to ground, and the switch 112 may be opened to reset the thyratron. The switch may be controlled by the timer 5 to reset the thyratron before each operation. Suppressor grids 113 and 114 of the thyratrons are connected to the cathodes thereof. Terminals 115 and 116 of voltage sources are connected to potentiometers 117 and 118 respectively, connected at their opposite ends to ground and having sliders connected to the control grids 74 and 84 of the thyratrons 75 and 85 to provide desired grid biases therefor. The bias on the thyratrons 75 and 85 tend to restrain firing of the thyratrons so that they will fire only when the pulses applied thereto reach predetermined amplitudes.

The grid 74 of thyratron 75 is also connected by resistor 121 to an output line 122 leading to a register, which is actuated by pulses transmitted from the amplifier 50 thereto. A capacitor 124 connects the line 122 to ground.

Resistors 131, 132, and 134 form a feedback circuit for controlling the output signals of the amplifier 50. Resistors 132 and 134 form a voltage divider and connect the line 77 from amplifier 50 to ground. The switch contact 9 substitutes other resistors for the resistor 134 when voltages from other sources are checked. The junction of the resistor 132 and 134 is connected through resistor 131 to the input of amplifier 50. The amplifier 50 provides very high gain and the gain is reduced by the feedback circuit to a desired level. The level is individually controlled for each voltage being checked by action of the switch contact 9.

Considering now the over-all operation of the system, the pulse source (timer 5) periodically actuates the relay 25 to open the contacts 24 and then close them a short time later, for example, for a period of .2 second. This causes the difference voltage at point 14 to charge the capacitor 21, and then it is discharged to form the pulse 30. The pulse 30 is integrated by resistor 31 and capacitor 36 and is differentiated by a capacitor 41 and resistor 42 to form a new pulse 43 coincidental with the trailing edge of the pulse 30 and proportional in magnitude to the amplitude of pulse 30 which in turn is proportional to the voltage at the point 14. The pulse 43 is amplified, and if it is of sufficient magnitude, it actuates the thyratron 75 to actuate the hammer solenoid 89 to indicate that the control voltage is above the allowable limit. However, if the pulse 43 is inverted and sufficiently large it will cause actuation of the thyraton 85 and the hammer solenoid 101 to indicate that the control voltage is below its allowable limit. Thus, as long as there is no actuation of either the hammer solenoid 89 or the hammer solenoid 101, it is assured that the voltage being sampled is within allowable limits. However, whenever one of these solenoids 89 and 101 is actuated, it will be indicated by the mark produced by the hammer solenoid, and by either the lamp 92 or the lamp 107, that the voltage is above or below its allowable limits.

The following constants for the circuits shown are given merely by way of illustration and are not intended to limit the scope of the invention in any way.

| | | |
|---|---|---|
| Resistor 13 | kilohms | 950 |
| Resistor 16 | do | 45 |
| Resistor 17 | do | 5 |
| Resistor 22 | ohms | 220 |
| Resistor 25 | megohms | 1 |
| Resistor 31 | kilohms | 56 |
| Resistor 42 | do | 544 |
| Resistor 90 | do | 12 |
| Resistor 91 | do | 330 |
| Resistor 105 | do | 12 |
| Resistor 106 | do | 330 |
| Resistor 111 | do | 6.1 |
| Resistor 131 | do | 550 |
| Resistor 132 | do | 50 |
| Capacitor 21 | microfarads | .022 |
| Capacitor 36 | do | .0022 |
| Capacitor 41 | do | .0056 |
| Capacitor 124 | do | .068 |
| Capacitor 56 | do | .047 |
| Capacitor 62 | do | .047 |
| Capacitor 73 | do | .01 |
| Capacitor 83 | do | .01 |
| Capacitor 151 | do | .1 |
| Capacitor 152 | do | 25 |
| Capacitor 153 | do | .1 |
| Capacitor 154 | micromicrofarads | 390 |
| Capacitor 155 | microfarads | .1 |
| Capacitor 156 | do | .1 |
| Capacitor 157 | do | 25 |

It is apparent from the above that a relatively simple arrangement is provided which continuously monitors one or more voltages in order, and gives either or both sound and visual indications when each voltage reaches a value outside the predetermined limits. The direct current voltage monitored is converted to pulses so that amplification is simplified. The values of the voltage pulses are retained at the desired level through the amplifier so that the indication is accurate. As each voltage is repeatedly checked, an indication will be given the instant any voltage deviates from the desired limits.

I claim:

1. In a measuring device, a test voltage source, a standard voltage source, resistance means connected to said sources and having a terminal at which a voltage is provided which represents the difference in voltage of said test voltage source with respect to said standard voltage source, a parallel resistance-capacitance network connected to said terminal, means for periodically opening the resistance portion of said network to permit charge of the capacitance portion of said network whereby a pulse is created, means for integrating said pulse, means for differentiating the integrated pulse, means for amplifying the differentiated pulse, a thyratron, means for applying the amplified pulse to said thyratron, means for biasing said thyratron to provide operation thereof by pulses of a predetermined magnitude, and indicating means coupled to said thyratron and operated thereby when the pulses applied thereto exceed the predetermined magnitude.

2. In a measuring device, a first source of voltage to be tested, a second source of standard voltage, voltage-applying means connecting said first and second sources and having a terminal at which a voltage is provided which represents the difference in voltage of said test voltage source with respect to said standard voltage source, a parallel resistance-capacitance network connected on one side to said terminal, means for periodically opening the resistance portion of said network to permit charge of the capacitance portion thereof whereby a first pulse is created, means for integrating said pulse, means for differentiating the integrated pulse, means for amplifying the differentiated pulse, first and second thyratrons, means for biasing said thyratrons to provide triggering thereof by pulses of a magnitude greater than a predetermined magnitude, first and second indicating means coupled to said first and second thyratrons respectively and operated thereby, means for applying the amplified pulse with opposite polarity to said first and second thyratrons whereby said first thyratron is triggered in response to a first pulse of one polarity which exceeds a predetermined amplitude, and said second thyratron is triggered in response to a first pulse of opposite polarity which exceeds a predetermined amplitude.

3. In a measuring device, a first group of voltages to be tested, a second group of standard voltages, impedance means having a tap, switching means for selectively connecting associated voltages of said first and second groups to said impedance means for providing a voltage at said tap which represents the individual differences of the voltages of said first group with respect to the voltages of said second group respectively, a parallel resistance-capacitance network connected to said tap, means for periodically opening the resistance portion of said network to permit charge of the capacitance portion thereof whereby a pulse is created, means for integrating said pulse, means for differentiating the integrated pulse, amplifier means for amplifying the differentiated pulse, means controlled by said switching means for controlling the gain of said amplifier means, and indicating means coupled to said amplifier means and responsive to the amplitude and polarity of the differentiated pulse.

4. In a measuring device, a source of a first group of voltages to be tested, a source of a second group of standard voltages, impedance means having a tap thereon, first switch means for selectively connecting associated voltages of said first and second groups to said impedance means for providing a voltage at said tap which represents the individual differences of the voltages of said first group with respect to the associated voltages of said second group, a parallel resistance-capacitance network connected to said tap, second switch means for periodically opening the resistance portion of said network to permit charge of said capacitance portion thereof whereby pulses of a polarity and amplitude determined by the voltage difference between the aforesaid associated voltages are produced, timing means for operating said first switch means and said second switch means in synchronism, pulse translating circuit means coupled to said resistance-capacitance network and responsive to the pulses thereacross, said translating circuit means having a first output portion for supplying pulses of the same polarity as the applied pulses and a second output portion for supplying pulses of opposite polarity to the applied pulses, and indicator means having first and second portions respectively connected to said first and second output portions and responsive to pulses of one polarity, said first portion of said indicator means being responsive to the pulses from said first output portion to provide an indication when a voltage of said first group is higher than the associated standard voltage of said second group, and said second portion of said indicator means being responsive to the pulses from said second output portion to provide an indication when a voltage of said first group is lower than the associated standard voltage of said second group.

References Cited in the file of this patent

UNITED STATES PATENTS

| | | |
|---|---|---|
| 2,186,727 | Martin et al. | Jan. 9, 1940 |
| 2,271,478 | Eldridge | Jan. 27, 1942 |
| 2,480,636 | Dicke | Aug. 30, 1949 |
| 2,547,324 | Hurley | Apr. 3, 1951 |
| 2,625,822 | Nichols | Jan. 20, 1953 |
| 2,632,886 | Barney | Mar. 24, 1953 |
| 2,798,198 | Dauphinee | July 2, 1957 |